US010432644B2

(12) United States Patent
Burns et al.

(10) Patent No.: US 10,432,644 B2
(45) Date of Patent: Oct. 1, 2019

(54) ACCESS CONTROL SYSTEM FOR ENTERPRISE CLOUD STORAGE (71) Applicant: Box, Inc., Berkeley, CA (US)

(72) Inventors: Seena Burns, Los Altos, CA (US); Nakul Chander, Redwood City, CA (US); Adelbert Chang, Cupertino, CA (US); Jonathan Shih-Shuo Fan, Berkeley, CA (US); Divya Jain, San Jose, CA (US); Lev Kantorovskiy, Mountain View, CA (US); Benjamin John Kus, Alameda, CA (US); Justin Peng, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 164 days.

(21) Appl. No.: 15/277,451

(22) Filed: Sep. 27, 2016

(65) Prior Publication Data

US 2017/0093867 A1    Mar. 30, 2017

Related U.S. Application Data (60) Provisional application No. 62/233,964, filed on Sep. 28, 2015.

(51) Int. Cl.
*H04L 29/06* (2006.01)

(52) U.S. Cl.
CPC .......... *H04L 63/108* (2013.01); *H04L 63/101* (2013.01); *H04L 63/102* (2013.01); *H04L 63/107* (2013.01)

(58) Field of Classification Search
CPC ... H04L 63/101; H04L 63/108; H04L 63/102; H04L 63/107
See application file for complete search history.

(56) References Cited

U.S. PATENT DOCUMENTS

| 2015/0178516 | A1* | 6/2015 | Mityagin | G06F 21/6218 707/783 |
| 2015/0269383 | A1* | 9/2015 | Lang | G06F 21/57 726/1 |
| 2015/0310188 | A1* | 10/2015 | Ford | G06F 21/10 726/28 |
| 2016/0044054 | A1* | 2/2016 | Stiansen | H04L 63/1416 726/24 |
| 2016/0132300 | A1* | 5/2016 | Bernelas | G06F 8/427 717/109 |
| 2016/0132686 | A1* | 5/2016 | Peng | G06F 21/6218 726/28 |
| 2016/0191343 | A1* | 6/2016 | Dong | G06F 9/5083 709/226 |

(Continued)

*Primary Examiner* — Mohammad A Siddiqi
(74) *Attorney, Agent, or Firm* — Vista IP Law Group, LLP (57) ABSTRACT Systems and corresponding computer-implemented methods for context-based rule evaluation in an electronic data storage system are described. A request to perform an operation with respect to a resource is received from a client device, with the request including various attributes associated with the client device. At least one set of rules applicable to the operation is identified. The rules can be formed from a combination of primitives arranged to dynamically evaluate attributes associated with the resource and attributes associated with the client device. Based on the evaluation of the rule set(s), an action is identified to be performed with respect to the resource.

24 Claims, 6 Drawing Sheets (56) References Cited

U.S. PATENT DOCUMENTS

2016/0253078 A1* 9/2016 Ebtekar ................ G06T 11/206
                                                             715/735
2016/0323165 A1* 11/2016 Boucadair ............... H04L 43/12

* cited by examiner

ACCESS CONTROL SYSTEM FOR ENTERPRISE CLOUD STORAGE

CROSS-REFERENCE TO RELATED APPLICATION

This application claims priority to and the benefit of U.S. Provisional Patent Application 62/233,964, filed on Sep. 28, 2015, and entitled "Access Control System for Enterprise Cloud Storage," the entirety of which is incorporated by reference herein.

BACKGROUND

The present disclosure relates generally to data security and, more particularly, to systems and methods for context-based policy evaluation in an enterprise cloud storage environment Modern data storage systems that provide access to electronic files and other data over the internet generally incorporate standard access control techniques, such as encryption, password protection, and file permissions. For example, such systems can deny access to unauthorized users that do not have a valid username and password, and can limit the types of operations (e.g., read, write, modify, delete) that can be performed by authorized users with respect to specific individual files and/or folder structures. However, these access controls are limited by their failure to account for the context associated with a user and/or a requested operation and, as such, result in an all-or-nothing approach that exposes electronic data storage systems to additional risks.

BRIEF SUMMARY

Systems and methods for context-based rule evaluation are described. In one aspect, a computer-implemented method for rule-based access control comprises: receiving from a client device a request to perform an operation with respect to a resource, the request comprising a plurality of attributes associated with the client device; identifying at least one set of rules applicable to the operation, wherein a particular rule in the set of rules comprises a combination of primitives arranged to dynamically evaluate attributes associated with the resource and attributes associated with the client device on evaluation of the rule; evaluating the at least one set of rules; and determining an action to perform with respect to the resource based on a result of the evaluation of the at least one set of rules.

In one implementation, the operation comprises: logging into a system providing access to the resource, downloading the resource, previewing the resource, or creating a shared link based on the resource. Each rule in the set of rules can include an associated action that can be performed based on a result of an evaluation of the rule. The associated actions can be organized into a hierarchy based on a respective restrictiveness of each action. A particular primitive can include a function to determine whether a network address is blacklisted, or a function to determine whether the resource has associated metadata matching a given value.

In another implementation, a particular attribute associated with the client device comprises: whether the client device is trusted, a geographical location of the client device, an IP address associated with the client device, or an access level of a user associated with the client device. A particular attribute associated with the resource can include: contents of the resource, a classification of the resource, or a value of metadata associated with the resource. The action can include: blocking the operation, denying access to the resource, watermarking the resource, applying a retention policy to the resource, requiring further authentication, displaying a message to a user of the client device, logging the operation, or taking no action.

Identifying the at least one set of rules applicable to the operation can include: identifying a first set of rules applicable to all users performing the operation; identifying a second set of rules applicable to users of a particular enterprise performing the operation; and combining the first set of rules and the second set of rules into a single set of rules for evaluation. Determining the action to perform can include: identifying a subset of rules in the at least one set of rules that are satisfied when evaluated; and selecting, as the action to perform, a most restrictive action from actions associated with the subset of rules. The client device can be notified of the action to perform.

In yet another implementation, the method further includes determining that evaluation of a first one of the rules requires a first call to an external service to retrieve first information necessary to evaluating the first rule; determining that evaluation of a second one of the rules requires a second call to the external service to retrieve second information necessary to evaluating the second rule; and combining the first call and the second call to form a batched call to the external service. Evaluating the at least one set of rules can include: performing the batched call to the external service; receiving, in response to the batched call, the first information necessary to evaluate the first rule and the second information necessary to evaluate the second rule; and determining whether the first rule is satisfied based at least in part on the first information, and determining whether the second rule is satisfied based at least in part on the second information.

Other aspects of the above include corresponding systems and non-transitory computer-readable media. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
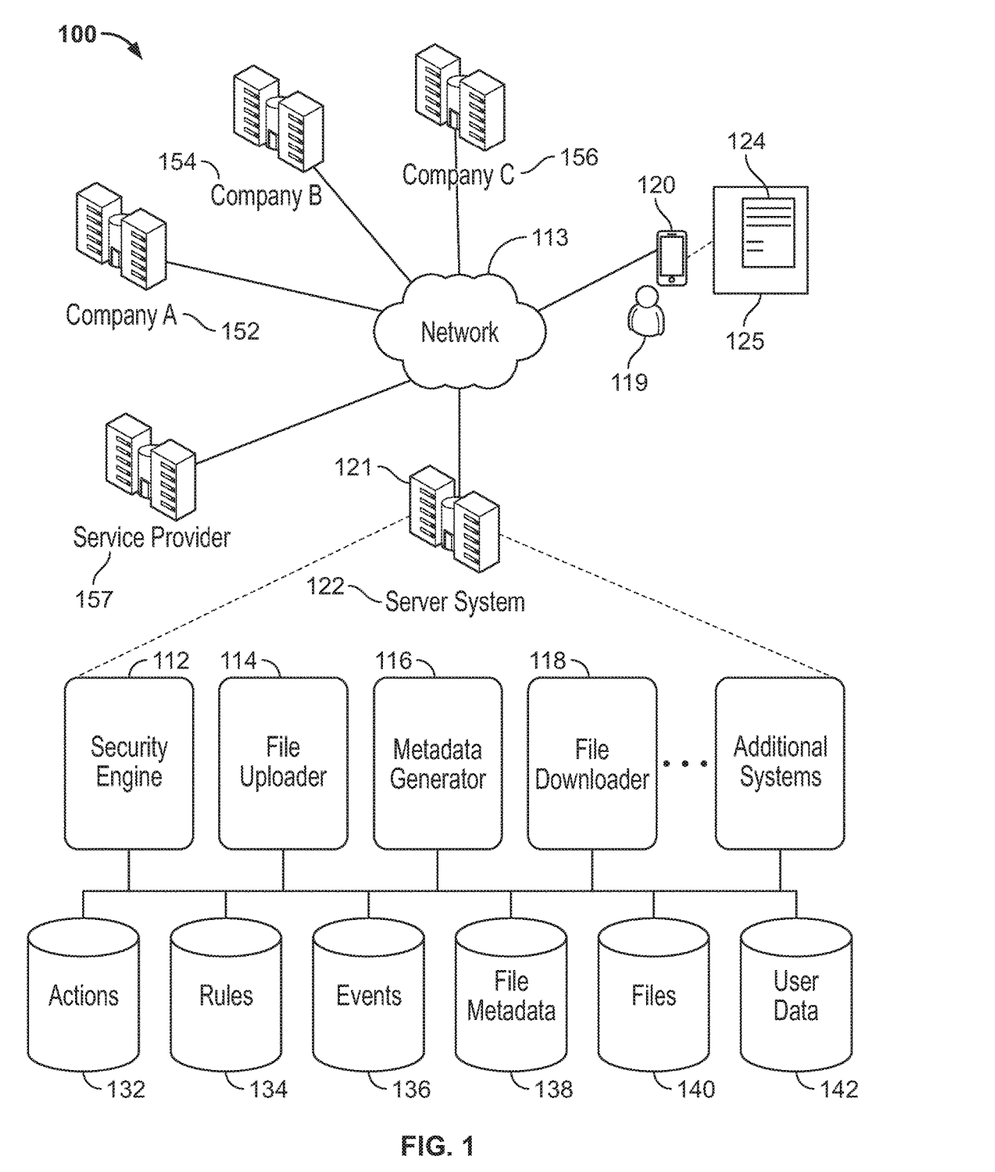
FIG. 1 depicts an example system for dynamic rule-evaluation in a cloud data storage environment.

FIG. 1 illustrates an example system 100 for access control for cloud storage. A server system 122 provides functionality for file storage. The server system 122 comprises software components and databases that can be deployed at one or more data centers 121 in one or more geographic locations, for example. The server system 122 software components comprise a security engine 112, file uploader 114, metadata generator 116, and file downloader 118. The software components can comprise subcomponents that can execute on the same or on different individual data processing apparatus. The server system 122 databases comprise an actions database 132, rules database 134, events database 136, file metadata database 138, files database 140, and user data database 142. The databases can reside in one or more physical storage systems. It should be appreciated that the server system 122 can also include additional systems and components (e.g., a login subsystem) that have access to, for example, actions database 132 and rules database 134, in order to provide the rule evaluation functionality at various checkpoints as described herein. The software components and databases will be further described below.

A user (e.g., user 119) or a server (e.g., servers of company A 152, company B 154, or company C 156) can access the server system 122 for file storage or retrieval through one or more data communication networks 113 such as the internet, for example. By way of illustration, the user 119 can access the server system 122 from a user interface 124 of an application 125 executing on the user's client device 120. The application 125 or a software running on a server (e.g., of company A 152) can access the server system 122 through an application programming interface (API) provided by the server system 122, for example.

The file uploader 114 is a software component that receives a file from a client device 120 or a server (e.g., through the API described above) and stores the file in files database 140. In some implementations, the files in the database 140 are stored as encrypted files. The user can provide metadata for the file, for example, in the user interface 124 when uploading the file to the server system 122. For instance, the user can provide a description (e.g., "field trip October 2014", "human resource file", "meeting notes 04/01/2015") in the user interface 124 when submitting the file to the server system 122. The file uploader 114 can in turn store the metadata (e.g., a description) of the file in the file metadata database 138, and associate with the metadata with the file stored in the files database 140.

The metadata associated with a particular file, folder, or other data can be stored in a defined data structure or template that has metadata fields (e.g., date modified, date uploaded, content type, owner, etc.). Templates can differ based on by file type, for example, there can be one type of template for images and another type of template for audio files. There can be a template hierarchy, for example, a global template can include metadata fields applicable to all data, and templates more applicable to specific file types can inherit the global fields and add additional fields (e.g., a template for an image file can inherit a "date created" metadata field, and include an "image resolution" metadata field). The server system 122 can use an API that allows the storage and retrieval of metadata using key/value pairs. For example, the API can include a function storeMetadata(key, value) for a template object, where to specify User1 as the owner of a particular video file having associated template "videoTemplate," the function is called as follows: videoTemplate.storeMetadata(owner, User1). In some implementations, the metadata stored in the file metadata database 138 is encrypted.

The metadata generator 116 is a software component that inspects an incoming file and generates metadata of the file, and stores the metadata in the metadata database 138. The metadata generator 116 can inspect and generate metadata for a file (synchronously) when the file is being received by the file uploader 114. In some implementations, the metadata generator 116 can also access a file stored in the files database 140, generate metadata for the file, and store the metadata in the file metadata database 138 in an offline mode.

In some implementations, a user can upload a file to the server system 122 through a service provider 157 (e.g., through one or more APIs provided by the service provider 157 or the server system 122). The service provider 157 inspects the file (or a copy of the file) and generates metadata for the file. The service provider 157 then submits the metadata (generated by the service provider 157) to the server system 122 for storage in file metadata database 138. In addition, the service provider 157 can provide the user's information and current user session information to the server system 122 to be stored in the user data database 142, for example. In more implementations, the service provider 157 can access (e.g., through an API provided by the server system 122) a file stored in the files database 140, generate metadata for the file, and store the metadata in the file metadata database 138.

Metadata for a file can be structured data embedded with the file. For instance, an image file (e.g., a Joint Photographic Experts Group or JPEG file) captured by a camera can include data such as number of pixels, compression mode, date captured, camera make and model, and so on stored with the file in Exchangeable Image File Format (EXIF). The metadata generator 116 can inspect EXIF data of an image file and store the EXIF data in the file metadata database 138.

As for another example, the metadata generator 116 can inspect a file's content and extract information from the content, and store the extracted information (or indication of the extracted information) in the file metadata database 138. For instance, the metadata generator 116 can inspect a file for words (e.g., one or more text strings) that may indicate sensitive information such as "non-disclosure agreement", "NDA", "confidential", "top secret", or a social security number. The metadata generator 116 can store the extracted words in the file metadata database 138 along with labels or tags that describe the metadata. The metadata generator 116 can also store in the file metadata database 138 an indication of extracted words (e.g., a flag indicating a social security number and a location within the file for the number), without storing the extracted words themselves.

The user data database 142 stores user information such as login credentials (e.g., a user name and a password) and affiliated organization (e.g., company B). The server system 122 (e.g., a software component such as file uploader 114 or file downloader 118) can also store in the user data database 142 access information (e.g., an Internet Protocol or IP address, device identifier, application identifier, session information, search history, download history, and so on) when a user accesses the server system 122.

When a user such as the user 119 requests to access the server system 122 or perform an action with respect to stored data accessible through the server system 122, from the user interface 124 on the user's client device 120, the user's request is first sent to the security engine 112, for example. The security engine 112 is a software component that determines if the user request is valid, malicious, or otherwise anomalous, and whether the request can be permitted or wholly or partially restricted, by using rules stored in the rules database 134, and determining one or more corresponding actions stored in the actions database 132. Advantageously, some rules, when evaluated, provide context-dependent results. In other words, these rules can provide different results based on the context of a user activity, session and device information, and other information. Thus, for example, the same rule can permit a user to view and save a file when he is using a trusted device and is within a particular geographic area, while only allowing the user to view but not download the file when using a trusted device outside of the particular geographic area, while further denying any access to the file when the user is accessing the server system 122 using an untrusted device.

In one implementation, rules are formed using primitive operators, or "primitives," which can include Boolean operators and values (e.g., AND, OR, NOT, true, false), mathematical operators (e.g., greater than, less than, greater than or equal to, less than or equal to, equal to, not equal to), and parameter-based operators. Parameter-based operators are primitives that take one or more input parameters and perform a function using the input in order to produce an output. As one example, a primitive named "blacklist" can determine if an input IP address or other network identifier exists in a set of blacklisted internet protocol (IP) addresses, ranges of IP addresses, or other blacklisted network identifiers (e.g., classless inter-domain routing (CIDR) notation addresses). In another example, a "matchesRegex" primitive can take as input a string of characters and a regular expression, and determine if one or more matches of the regular expression exist in the string. A further primitive, "hasMetadata" can determine whether a metadata template for one or more files or folders includes an expected value (e.g., whether the file/folder has a metadata label that indicates the file is confidential). Each rule can specify a condition (or a combination of conditions) that evaluates to true or false, and one or more actions that are performed if the rule condition is satisfied (i.e., rule evaluates to true). Rule conditions can be evaluated against such attributes as user data information, session data information, and/or resource (e.g., file, folder, link, or other electronic data) metadata, for example, and as further described below. Advantageously, this provides for a flexible policy engine that provides dynamic results from the evaluation of rules considering user, device and resource attributes.

Rule actions can be different for different user groups (e.g., enterprises, companies or affiliations), given the same rule. For instance, a particular rule (e.g., user device's network connection is from a foreign country) can be mapped to different actions for different user affiliations (e.g., deny access for a user with company A, allow file access for a user with company B, or allow read-only access for a user with no affiliation). Other mappings between a rule and an action are possible. Mappings can be stored (with corresponding actions) in the actions database 132. An action determined by the security engine 112 can be sent back to the user interface 124 (or an original caller application that sent the user's request) where the action is performed. For instance, if a determined action is asking for another set of credentials (e.g., two-factor authentication), the user interface 124 can display a request for the user 119 to answer a security question (e.g., "what is your mother's maiden name?").

Rules can be pre-defined by server system 122, for example, server system 122 can apply a set of global rules at a particular checkpoint to all users. As used herein, a "checkpoint" refers to a defined point or discrete event at which an activity can occur, such as logging into the server system 122, previewing a file, uploading a file, downloading a file, creating a shared link to a file, and so on. Such rules can be formulated to protect the security of server system 122 and can include, e.g., a rule that requires all uploaded files <10 MB to be scanned by antivirus software. Other rules can be customized or created by enterprise network technicians, information technology staff, administrators, customers, or other users using a graphical user interface (GUI) that allows a user to select and combine primitives and/or an API that allows users to define rules. For example, an administrator can create a rule applicable to users associated with a particular enterprise that forbids the uploading of executable files when a user is accessing the server system 122 from outside the secure enterprise network, but otherwise allows the uploading of such files. Through the GUI, a user can also associate the rule with one or more predefined or custom actions such that, when the rule evaluates to "true," action(s) are performed. The user can also specify the priority of actions for action conflict resolution, as further described below.

In one implementation, an API that allows users manipulate rules includes the following API calls:

API to create a new rule:

```
POST/enterprise/ENTERPRISE_ID/rules
{
    "checkpoint": "checkpoint",
    "description": "rule description",
    "rule": "{ json serialized rule }"
}
``` where "checkpoint" refers to the name of a checkpoint to which the new rule is applicable, "description" refers to a description of the rule, and "rule" refers to a defined rule using primitives, which can be provided in a JavaScript Object Notation (JSON) or other format API to update an action for a rule:

```
PUT/enterprise/ENTERPRISE_ID/rules/RULE_ID/action
{
    "action": "action",
    "context": "contextual info about action"
}
``` where "action" refers to the action to update, and "context" refers to a contextual description for the action.

API to get all rules for an enterprise identified by ENTERPRISE_ID:

GET/enterprise/ENTERPRISE_ID/rules

API to get a single rule by a rule identifier, RULE_ID, that applies to all enterprises:

GET/global/rules/RULE_ID

API to get an action for a rule (identified by RULE_ID) that applies to all enterprises:

GET/global/rules/RULE_ID/action

API to delete a single rule (identified by RULE_ID) for an enterprise identified by ENTERPRISE_ID:

DELETE/enterprise/ENTERPRISE_ID/rules/RULE_ID

For purposes of illustration, various rules that can be defined using this API are as follows:

EXAMPLE 1

Determine whether a particular user's IP address exists in a list of blacklisted IP addresses at a particular checkpoint. A "rule" associated with that checkpoint can define that the primitive operation ("op") to be executed is "blacklistedIp", using the following JSON rule representation:

{"op":"blacklistedIp"}

EXAMPLE 2

Determine whether a file/folder has metadata named "metadata-template", with key "template-field" and with value "some-value" (true if it does, false if it does not). The "rule" can define that the primitive operation ("op") to be executed is "hasMetadata". The parameters passed to the hasMetadata function are the metadata template name, key, and expected value.

{"op":"hasMetadata","config":{"template":"metadata-template","key": "template-field","expectedValue":"some-value"}}}

EXAMPLE 3

Determine whether a file/folder has a file name matching at least one specified regular expression AND the file does NOT have metadata named "metadata-template", with key "template-field" and with value "some-value" (true if it does, false if it does not).

```
{"op":"&&", "args": [
    {"op": "matchesRegex"},
    {"op": "not", "arg":
        {"op":"hasMetadata","config":{"template":"metadata-template","key":"template-field","expectedValue":"some-value"}}}
    }
]}
```

The security engine 112 can, using information related to the user, the user's session, and/or the user's device, determine applicable rules, evaluate the rules, and identify a corresponding action(s) for the user's request. Various types of information can be provided as input for the evaluation of a particular rule, including, for example, user agent, IP address, user identifier, identifier for the user's affiliation, user actions (e.g., login, signup, token, preview, download, upload), identifier of the application 125, or identifier of the client device 120, age of the user's account (e.g., accounts older than 60 days can be trusted more than newly created accounts), geolocation (e.g., whether the client device 120 is accessing the server system 122 from a trusted location, such as a geographical area associated with a company location, versus an untrusted location, such as a geolocation known to generate spam accounts, hacking attempts, or other malicious activity), whether the user's device is trusted (e.g., whether the device 120 is logged in through a secure connection, whether the device 120 meets an enterprise security policy, and the like), and whether an action associated with the rule has occurred within a previous period of time (e.g., 3 minutes). Other types of user information for evaluating rules and determining an action are possible.

An action determined by the security engine 112 can be, for example, allowing login only (no uploading or downloading of files), emailing an administrator of the user's affiliation, denying or otherwise blocking the user's request, deleting the user, requiring reauthentication, requiring an additional form of authentication (e.g., two-factor authentication, captcha), requiring a password change, allowing access to files with no security restrictions, requiring a virus scan of an uploaded file, requiring a security scan of the user's device, watermarking files viewed or downloaded by the user, redacting information (e.g., redacting personally identifiable information using optical character recognition, regular expression searching, and/or third-party redaction services) from files viewed or downloaded by the user based on metadata associated with the files, archiving a file (e.g., to comply with a legal hold), disabling the ability of the user to open links to files shared by another user, showing a message (e.g., warning, error, etc.) to the user, logging a message in an action log, or taking no action. Other types of actions are contemplated.

Rules used by the security engine 112 can be associated with a particular checkpoint, and can also be selected based on one or more factors including, for example, the user attempting an action, a group that the user is associated with, metadata associated with the file, IP address (e.g., of an anonymizing network), file name pattern, search pattern, maximal time difference for immediately upload after signup, maximal account age for filename match, or geographical location or distance. Other types of factors are contemplated.

If the security engine 112 determines that applicable rules result in no corresponding action, the security engine 112 can hand off the user's access request to the appropriate functional component, such as file downloader 118 or file uploader 114 for downloading or uploading files from or to the server system 122, respectively. The security engineer 112, the file uploader 114, and the file downloader 118 can store the history of the user's request and subsequent actions (taken by the user or the server system 112) in the events database 136.

Figure 2:
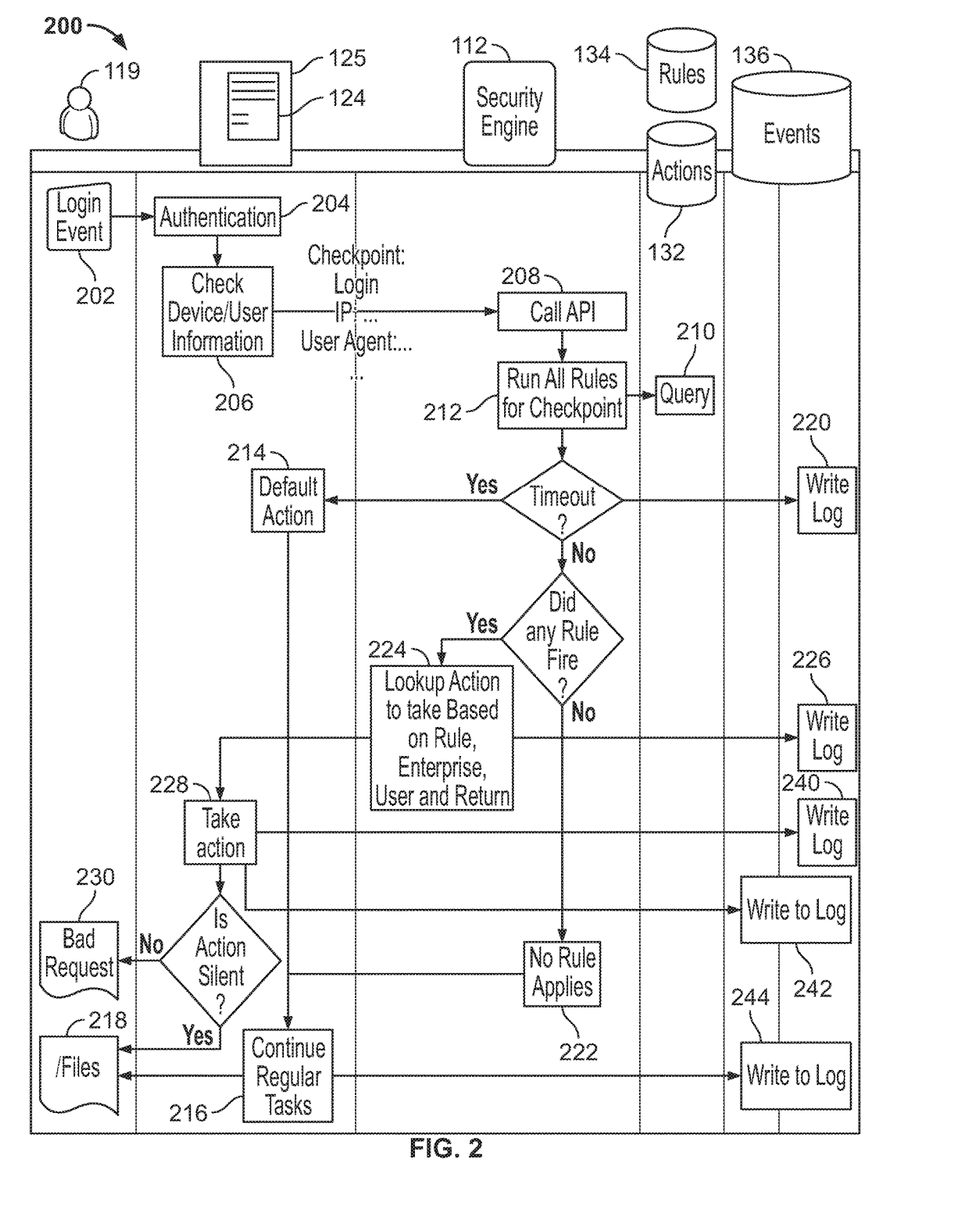
FIG. 2 depicts a data flow diagram of an example method for rule evaluation at a checkpoint.

FIG. 2 is a data flow diagram of an example method for determining if an action requested to be taken at a particular checkpoint is permitted, restricted, malicious or otherwise anomalous. In FIG. 2, when the user 119 accesses the server system 122 (202), the application first authenticates the user, for example, by providing credentials provided by the user to an authentication server of the server system 122 and receives an confirmation (204). The user's activity and/or information associated with the user/device can be evaluated by application 125 or security engine 112 to determine, for example, if the device is trusted, or if there are anomalies or other issues (206), by providing user and session information to the security engine 112 through an API (208). The security engine 112, based on the user and session information, accesses the rules database 134 and actions database 132 (210) for rules applicable to the checkpoint (212). The security engine 112 can have a timeout period for determining applicable rules and actions. If the timeout period (e.g., 50 milliseconds) has elapsed, the security engine 112 assumes that no rule is applicable (214), and notifies the application 125 to allow the user to continue, for example, to download a file as requested, e.g., to access the file in the user interface 124 of the application 125 (218). Alternatively, after the timeout period elapses, the security engine 112 can block the user's action by default. The security engine 112 also records the related activities in the events database 136.

Before the timeout period elapses, if the security engine 112 determines that the user's request results in no applicable rules based on the rule conditions, the security engine 112 can determine that the user's request is acceptable (e.g., not anomalous) (222), and notifies the application 125 to allow the user to continue (216). If the security engine 112 determines that the user's request at the checkpoint results in one or more applicable rules, the security engine 112 can evaluate the rule(s) to determine one or more actions (e.g., allow access, deny access) to perform (224). The security engine 112 also records the related activities in the events database 136 (226). The security engine 112 notifies the application 125, which in turns carries out the action(s) determined by the security engine 112 (228). If the action is a denial of the user request and is specified as a "silent" action, the application 125 can provide the user (through the user interface 124) an indication of bad request (e.g., without providing specific reasons). The application 125 can also write actions and user activities to the events database 136 (242, 244) or servers of the user's affiliation.

Figure 3:
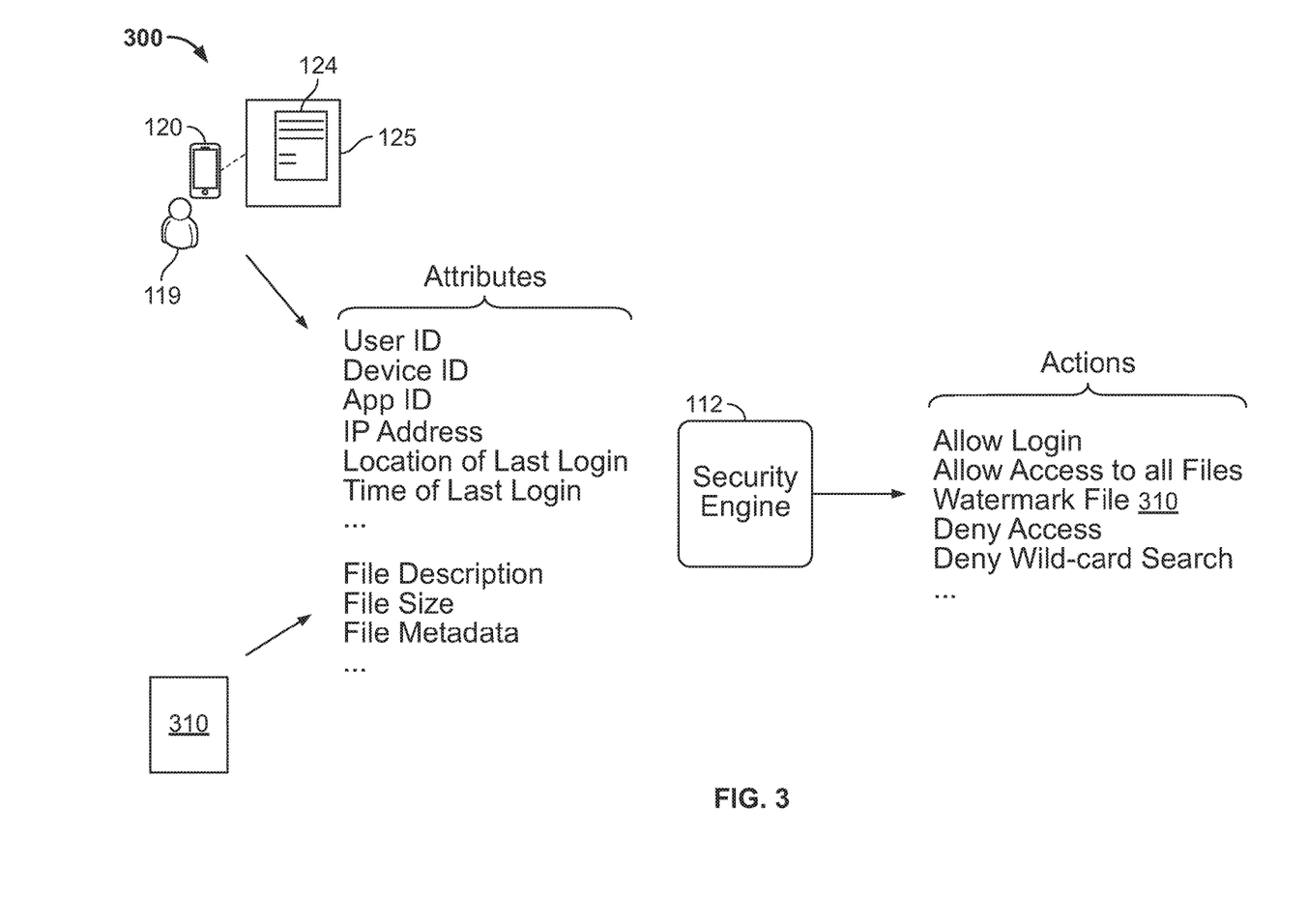
FIGS. 3-5 depict data flow diagrams of example methods for evaluating a user request according to one or more rules.

FIG. 3 is a data flow diagram of an example method for determining if a user's request (e.g., to access a file stored in the server system 122) is permitted or will be restricted in some manner based on applicable rules. In this example, the user 119 accesses the server system 112 from the user's client device 120 and requests a copy of a file 310 stored in the files database 140. As described earlier, the security engine 112 can, based on the user's request, access data stored in the user data database 142, events database 136, files database 140, and file metadata database 138 for user information (e.g., user identifier, device identifier, application identifier, operating system identifier, device location, IP address, location of the last time and location the user had login to the server system 122) and information of the file 310 (e.g., file description, file size, extracted words). The security engine 112 can use the user and file information, and rules and actions stored in the rules database 134 and actions database 132, to determine one or more actions to take in response to the user's request (e.g., allow the user to login, allow user to access all files stored in the files database 140, watermark a copy of the file 310, deny the user's access, deny the user to perform a search with wild-cards).

More particularly, the security engine 112 can use attributes associated with the user and file information (e.g., metadata), and determine an action that allows, denies, or restricts the user's request. For example, the security engine 112 can construct a graph of attributes (e.g., each node corresponding to an attribute). The graph can organize attributes according to a dependency scheme among attributes wherein a given attribute is dependent on one or more other attributes if those other attributes are considered subparts or sub-attributes. For example, a user ID attribute can have child attributes of user name and domain name (for organizations that have multiple domains). Rules having conditions satisfied by attributes along a path in the graph are considered matches and fired to cause performance of one or more actions. In further implementations, a highest priority rule which having conditions satisfied by a path in the graph is selected to be fired. Rule priority can be based on how restrictive a rule is, for example, where the highest priority rule is the most restrictive in terms of user access to a document.

In some implementations, the security engine 112 can calculate a score (i.e., level of trust) based on the rules or attributes described above, and determine an action according to the score. By way of illustration, the security engine 112 can calculate a score between 0 and 1. A score of 0 corresponds to an action of no access to the server system 122 at all. For example, a score of 1 corresponds to an action of allowing a user to access the file the user requests. A score greater than or equal to 0.7 but less than 1 corresponds to an action of providing the user a watermarked copy of the file the user requests. A score of greater than or equal to 0.5 but less than 0.7 corresponds to an action of providing the user a watermarked and redacted copy of the file the user requests. A score of greater than 0 but less than 0.5 corresponds to an action of asking the user for a second set of credentials (e.g., for two-factor authentication). Other combinations of actions and scoring (as calculated by the security engine 112) are possible.

Figure 4:
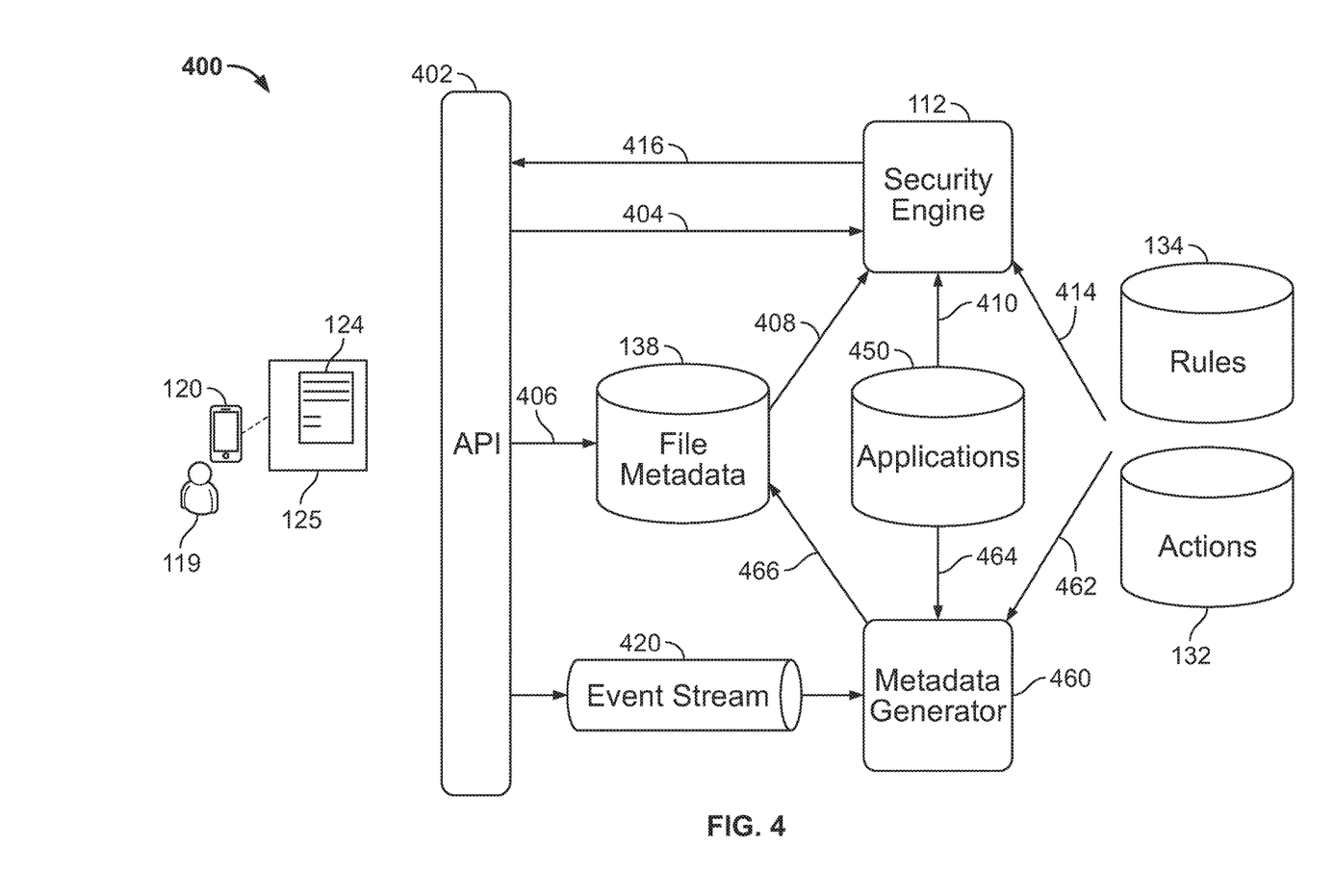

FIG. 4 is a data flow diagram of another example method for determining if a user's request for accessing a file stored in the server system 122 is permitted, must be restricted, or is malicious or otherwise anomalous. In FIG. 4, the user 119 requests a file stored in the files database 140 through the user interface 124 of the application 125 running on the user's client device 120. The request can be sent to the server system 122 through an API 402. The API 402 can include one or more software components provided by the server system 122 or other service providers. The API 402 can send the user's request to the security engine 112 (404). The user's request can include an identifier of the user 119, an identifier of the application 125, an identifier of the user's client device 120, an identifier of the file requested by the user, and session information such as access type (e.g., based on Hypertext Transfer Protocol over Secure Sockets Layer or HTTPS) and access location (e.g., country, IP address).

The API 402 can access the file metadata 138 based on the identifier of the file requested by the user (406), and provide the file's metadata to the security engine 112 (408). The API 402 can also access an applications database 450 for information of the application 125 and provide the application information to the security engine (410). The applications database 450 can be part of the server system 122, for example.

As described earlier, the security engine 112 can, based on the user's request (404), metadata of the file requested (408), and information about the user's application (410), access the rules database 134 and actions database 132 for relevant rules and actions (414), and determine an action in response to the user's request. The security engine 112 then sends the determined action to the API 402 (416). The API 402 can respond to the user's request based on the determined action (e.g., allow access to the requested file, deny user's request).

In an "offline" mode that can be separated from a user's request in real-time, the API 402 can provide through an event stream 420 (a "fire hose") a file uploaded to the server system 122 by the user 119 and information related to the uploaded file and the user 119 to a metadata generator 460. The metadata generator 460 can be the metadata generator 116 of the server system 122 or the metadata generator of a service provider as describer earlier. In some implementations, metadata can be generated by machine learning or other software algorithms. The metadata generator 460 can access rules database 134 (462) and applications database 450 (464) for related file context rules, generate metadata for the uploaded file, and store the metadata in the file metadata database 138 (466).

Figure 5:
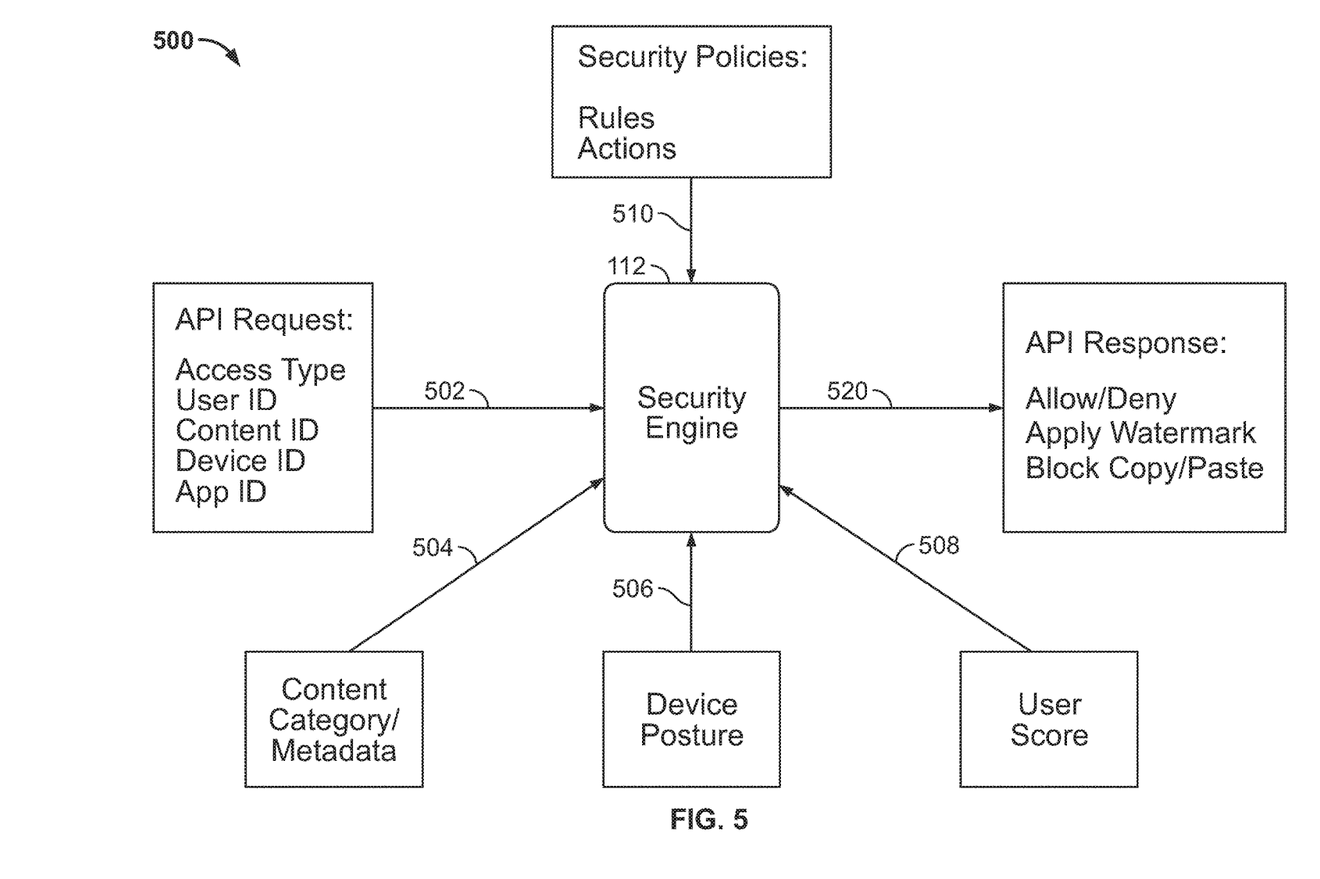

FIG. 5 is a data flow diagram of yet another example method for determining if a user's request for accessing a file stored in the server system 122 is permitted or malicious, or otherwise anomalous. As described in reference to FIG. 4, the security engine 112 receives a user's request for a file stored in server system 122 through an API (502). The request can include access type (e.g., HTTPS), user identifier, content (file) identifier, device identifier, and application identifier. The security engine 112 can determine an action in response to the user's request based on the file's metadata and category (504), device information or "posture" (506), a user score (508), and available rules and actions (510). As described earlier, metadata of a file can include descriptions designated by the file's originator, and metadata generated by the metadata generator 116 or the metadata generator of a service provider. The device posture can include examination and determination of the user's device including an encryption level of the user's connection, security software (e.g., anti-virus) installed on the user's device, for example. Other device postures are possible. A software component of the server system 122 can access the user's information (e.g., session history, search history) stored in the user data database 142 and examine the user's session information (e.g., IP address, request type), and determine a user score (e.g., a lower score if the user's current session is from a different country from past sessions).

The security engine 112 can, based on the file metadata, device posture, and user score, determine an action that matches available rules but with the lowest level of access, and provide the determined action to the API (520).

Figure 6:
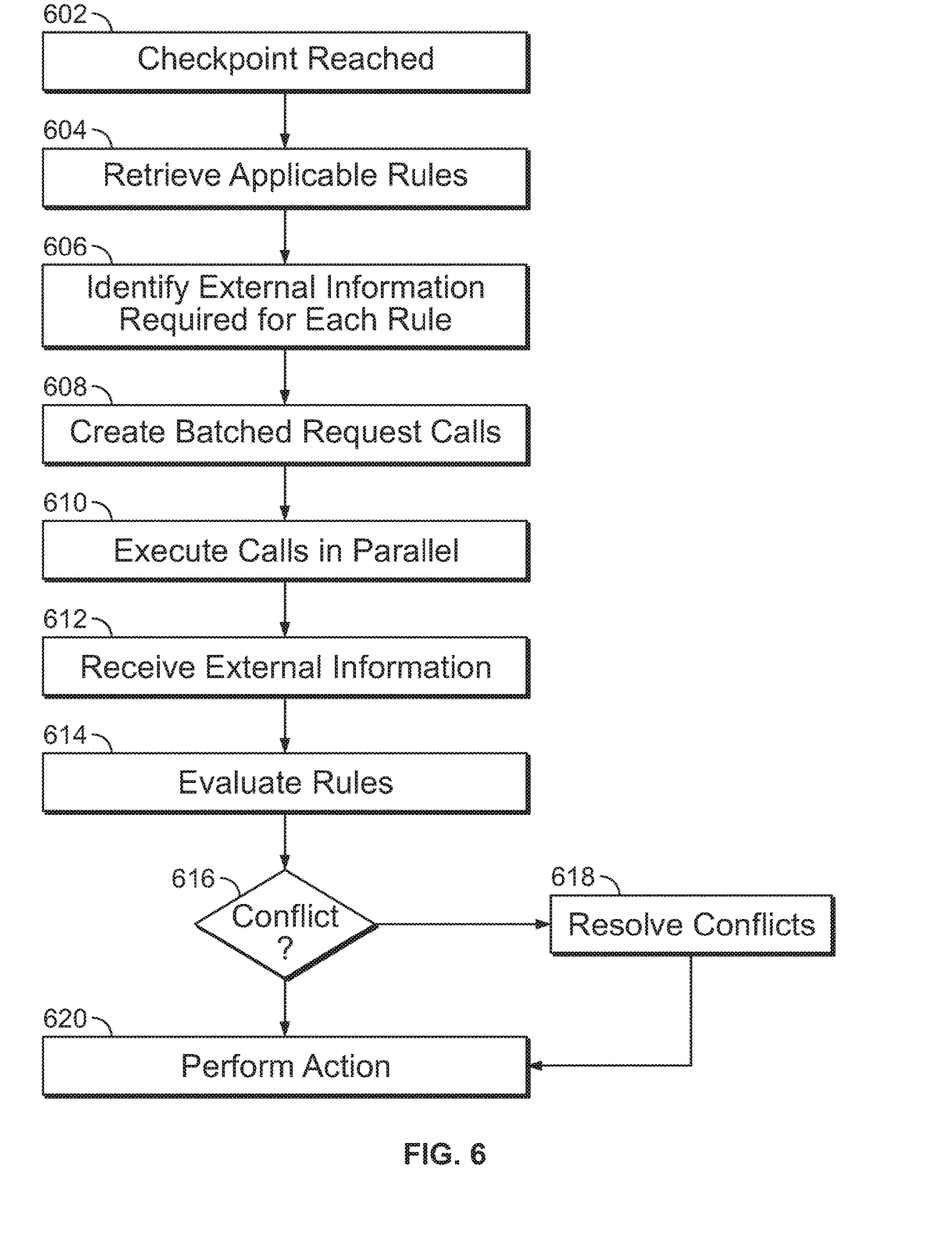
FIG. 6 depicts an example method for batching requests and action conflict resolution in a system for context-based rule-evaluation.

FIG. 6 depicts an example method for processing a set of rules at a checkpoint. Upon reaching a particular checkpoint (602) (e.g., logging in, downloading a file, etc.), one or more sets of rules applicable to the checkpoint are retrieved (604) by security engine 112 from rules database 134. The retrieved sets of rules can include, for example, (i) a global set of rules applicable to all users reaching the particular checkpoint, (ii) a user group set of rules that are applicable to users of a particular enterprise or other group at the particular checkpoint, and/or (iii) a user set of rules that are applicable to the specific user reaching the checkpoint. Retrieval of the rules sets from rules database 134 can be accomplished in one or more database calls. In some instances, to minimize the amount of logical processing that would have to be performed to identify applicable rules in rules database 134, all rules or a larger subset of rules stored in rules database 134 can be retrieved in bulk (e.g., perform a database call to retrieve an entire table of rules), even though not all of such retrieved rules would be applicable to the particular checkpoint, user group, and/or user.

Following retrieval of the set(s) of rules, security engine 112 can examine the rules to determine what information will be needed for their evaluation (606). For example, an evaluation of a particular rule can require the retrieval of information, such as file metadata, user session information, historical user activity, etc., from external services (e.g., services available over a local or global network, such as the internet) and data stores, such as events database 136, file metadata database 138, files database 140, and user data database 142. By identifying the required information prior to fully evaluating the rules, security engine 112 can avoid making multiple requests for information (e.g., calls to databases, HTTP requests, etc.) as it evaluates each rule.

Using the knowledge of the information required for evaluation, security engine 112 can form batched data requests that minimize the number of requests that need to be made to each external service (608). For example, if Rule A requires metadata for Files 1, 2, and 3; and Rule B requires metadata data for Files 2, 4, and 5; then security engine 112 can create a single batched call to file metadata database 138 to request metadata for Files 1 through 5. Upon formulating some or all of the batched calls, security engine 112 can execute the formulated calls in parallel (610) by, for example, starting each request in one or more separate threads, and combining the results of the thread executions. In some implementations, the batching process determines what information needs to be retrieved for multiple requests of one or more users, and formulates batched calls that request the data needed for some or all of the multiple requests. In other implementations, a strict separation is maintained among different users of the server system 122, such that the batching process is run separately for each user and no information is combined or shared among batched calls for different users.

Security engine 112 then receives the information requested via the batched calls (612) and evaluates the rule set(s) (614). In some instances, evaluation of the rules can result in a number of conflicting actions (616). For example, if a user attempts to download a document, the evaluation of one rule might result in a requirement that the document be watermarked, whereas the evaluation of another rule might require that access to the document be denied, whereas the evaluation of a third rule might allow unrestricted access to the document. Action conflicts can be resolved using different methods (618). In one implementation, the most restrictive action governs (using the foregoing example, access to the document would be denied, rather than permitting unrestricted access or watermarking the document). In one implementation, a hierarchy of actions, from most restrictive to least restrictive is: (1) block the attempted user activity; (2) disable the user's ability to open shared links to other files; (3) show a warning or other message to the user; (4) log the activity only; and (4) take no action. Security engine 112 then performs the determined action (620).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more 202 computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A computer-implemented method for rule-based access control, the method comprising:
receiving from a client device a request to perform an operation with respect to a resource stored in a cloud storage environment, the request comprising a plurality of attributes associated with the resource being requested and the client device;
identifying at least one set of rules applicable to the operation, the at least one set of rules performing access control of the resource in the cloud storage environment, the at least one set of rules comprises a combination of primitives arranged to dynamically evaluate two types of attributes, wherein a first type of attribute corresponds to a first set of attributes from the plurality of attributes associated with the resource being requested and a second type of attribute corresponds to a second set of attributes from the plurality of attributes associated with the client device;
determining that evaluation of a first one of the rules includes a first call to an external service to retrieve first information for evaluating the first rule;
determining that evaluation of a second one of the rules includes a second call to the external service to retrieve second information for evaluating the second rule;
combining the first call and the second call to form a batched call to the external service;
evaluating the at least one set of rules by:
performing the batched call to the external service,
receiving, in response to the batched call, the first information to evaluate the first rule and the second information to evaluate the second rule, and
determining whether the first rule is satisfied based at least in part on the first information, and determining whether the second rule is satisfied based at least in part on the second information, wherein the at least one set of rules corresponds to the primitives that correlate to a combination of the two types of attributes; and
determining an action to perform with respect to the resource based on a result of the evaluation of the at least one set of rules.

2. The method of claim 1, wherein the operation comprises: logging into a system, providing access to the resource, downloading the resource, previewing the resource, or creating a shared link based on the resource.

3. The method of claim 1, wherein each rule in the set of rules comprises an associated action that can be performed based on a result of an evaluation of the rule.

4. The method of claim 3, wherein the associated actions are organized into a hierarchy based on a respective restrictiveness of each action.

5. The method of claim 1, wherein a particular primitive comprises a function to determine whether a network address is blacklisted.

6. The method of claim 1, wherein a particular primitive comprises a function to determine whether the resource has associated metadata matching a given value.

7. The method of claim 1, wherein a particular attribute associated with the client device comprises at least one of: whether the client device is trusted, a geographical location of the client device, an IP address associated with the client device, or an access level of a user associated with the client device.

8. The method of claim 1, wherein a particular attribute associated with the resource comprises at least one of: contents of the resource, a classification of the resource, or a value of metadata associated with the resource.

9. The method of claim 1, wherein the action comprises: blocking the operation, denying access to the resource, watermarking the resource, applying a retention policy to the resource, requiring further authentication, displaying a message to a user of the client device, logging the operation, or taking no action.

10. The method of claim 1, wherein identifying the at least one set of rules applicable to the operation comprises:
identifying a first set of rules applicable to all users performing the operation;
identifying a second set of rules applicable to users of a particular enterprise performing the operation; and
combining the first set of rules and the second set of rules into a single set of rules for evaluation.

11. The method of claim 1, wherein determining the action to perform comprises:
identifying a subset of rules in the at least one set of rules that are satisfied when evaluated; and
selecting, as the action to perform, a most restrictive action from actions associated with the subset of rules.

12. The method of claim 1, further comprising notifying the client device of the action to perform.

13. A system for rule-based access control, the system comprising:
at least one memory for storing computer-executable instructions; and
at least one processing unit for executing the instructions, wherein execution of the instructions programs the at least one processing unit to perform operations comprising:
receiving from a client device a request to perform an operation with respect to a resource stored in a cloud storage environment, the request comprising a plurality of attributes associated with the resource being requested and the client device;
identifying at least one set of rules applicable to the operation, the at least one set of rules performing access control of the resource in the cloud storage environment, the at least one set of rules comprises a combination of primitives arranged to dynamically evaluate two types of attributes, wherein a first type of attribute corresponds to a first set of attributes from the plurality of attributes associated with the resource being requested and a second type of attribute corresponds to a second set of attributes from the plurality of attributes associated with the client device;
determining that evaluation of a first one of the rules includes a first call to an external service to retrieve first information for evaluating the first rule;
determining that evaluation of a second one of the rules includes a second call to the external service to retrieve second information for evaluating the second rule;
combining the first call and the second call to form a batched call to the external service;
evaluating the at least one set of rules by:

performing the batched call to the external service, receiving, in response to the batched call, the first information to evaluate the first rule and the second information to evaluate the second rule, and determining whether the first rule is satisfied based at least in part on the first information, and determining whether the second rule is satisfied based at least in part on the second information, wherein the at least one set of rules corresponds to the primitives that correlate to a combination of the two types of attributes; and determining an action to perform with respect to the resource based on a result of the evaluation of the at least one set of rules.

14. The system of claim 13, wherein the operation comprises: logging into a system, providing access to the resource, downloading the resource, previewing the resource, or creating a shared link based on the resource.

15. The system of claim 13, wherein each rule in the set of rules comprises an associated action that can be performed based on a result of an evaluation of the rule.

16. The system of claim 15, wherein the associated actions are organized into a hierarchy based on a respective restrictiveness of each action.

17. The system of claim 13, wherein a particular primitive comprises a function to determine whether a network address is blacklisted.

18. The system of claim 13, wherein a particular primitive comprises a function to determine whether the resource has associated metadata matching a given value.

19. The system of claim 13, wherein a particular attribute associated with the client device comprises at least one of: whether the client device is trusted, a geographical location of the client device, an IP address associated with the client device, or an access level of a user associated with the client device.

20. The system of claim 13, wherein a particular attribute associated with the resource comprises at least one of: contents of the resource, a classification of the resource, or a value of metadata associated with the resource.

21. The system of claim 13, wherein the action comprises: blocking the operation, denying access to the resource, watermarking the resource, applying a retention policy to the resource, requiring further authentication, displaying a message to a user of the client device, logging the operation, or taking no action.

22. The system of claim 13, wherein identifying the at least one set of rules applicable to the operation comprises:

identifying a first set of rules applicable to all users performing the operation;

identifying a second set of rules applicable to users of a particular enterprise performing the operation; and combining the first set of rules and the second set of rules into a single set of rules for evaluation.

23. The system of claim 13, wherein determining the action to perform comprises:

identifying a subset of rules in the at least one set of rules that are satisfied when evaluated; and selecting, as the action to perform, a most restrictive action from actions associated with the subset of rules.

24. The system of claim 13, further comprising notifying the client device of the action to perform.

* * * * *